US008700017B2

(12) United States Patent
Kim et al.

(10) Patent No.: US 8,700,017 B2
(45) Date of Patent: Apr. 15, 2014

(54) SYSTEM AND METHOD FOR TRANSMITTING AND RECEIVING AN EVENT MESSAGE

(75) Inventors: Jung Hun Kim, Busan (KR); Jae Hwan Kim, Suwon-si (KR); Min Chul Kim, Sungnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 13/419,795

(22) Filed: Mar. 14, 2012

(65) Prior Publication Data
US 2012/0238256 A1 Sep. 20, 2012

(30) Foreign Application Priority Data

Mar. 15, 2011 (KR) .................. 10-2011-0022825
Dec. 5, 2011 (KR) .................. 10-2011-0129313

(51) Int. Cl.
*H04M 3/00* (2006.01)
(52) U.S. Cl.
USPC ..................................... 455/415; 455/418
(58) Field of Classification Search
USPC ........ 455/415, 412.1, 466, 414.3, 404.1, 419; 709/204, 26.44; 379/45
See application file for complete search history.

(56) References Cited

U.S. PATENT DOCUMENTS

| 7,573,984 | B2* | 8/2009 | Ger et al. ........................ 379/45 |
| 8,467,816 | B2* | 6/2013 | Celik et al. .................... 455/466 |
| 2005/0197096 | A1* | 9/2005 | Yang et al. ................. 455/404.1 |
| 2006/0063514 | A1* | 3/2006 | Choi et al. ................. 455/414.1 |
| 2009/0176486 | A1* | 7/2009 | Jung ............................. 455/419 |
| 2009/0221307 | A1* | 9/2009 | Wolak et al. ................. 455/466 |

FOREIGN PATENT DOCUMENTS

WO WO 99/29127 * 10/1999

* cited by examiner

*Primary Examiner* — Nizar Sivji
(74) *Attorney, Agent, or Firm* — Jefferson IP Law, LLP

(57) ABSTRACT

A system for transmitting and receiving an event message is provided. The system comprises a transmitting terminal that generates an event message, and that transmits the event message and caller information, an event message service server that stores phonebook data after receiving the phonebook data transmitted from at least one terminal, that searches for a receiving terminal including the caller information in the phonebook data among receiving terminals included in the phonebook data of the transmitting terminal when receiving the event message, and that transmits the event message to the searched receiving terminal, and a receiving terminal that receives an event message transmitted by the event message service server, and informs its user of reception of the event message.

34 Claims, 12 Drawing Sheets

SYSTEM AND METHOD FOR TRANSMITTING AND RECEIVING AN EVENT MESSAGE

PRIORITY

This application claims the benefit under 35 U.S.C. §119(a) of a Korean patent application filed on Mar. 15, 2011 in the Korean Intellectual Property Office and assigned Serial No. 10-2011-0022825, and a Korean patent application filed on Dec. 5, 2011 in the Korean Intellectual Property Office and assigned Serial No. 10-2011-0129313, the entire disclosures of which are hereby incorporated by reference.

BACKGROUND OF THE INVENTION

1. Field of the Invention

The present invention relates to a method and system for transmitting and receiving an event message. More particularly, the present invention relates to a method and system for transmitting and receiving an event message, which registers phonebook data of users in a server that manages an event message, and which transmits an event message to at least one user having mutually registered phonebook data when an event message transmission is requested.

2. Description of the Related Art

Recently, with remarkable advancement of information communication technologies and semiconductor technologies, portable terminals are being widely distributed and used. In particular, recent portable terminals are reaching a mobile convergence phase covering the areas of other terminals beyond traditional unique areas. As a representative example, mobile communication terminals are providing various functions such as a TV viewing function (e.g., a mobile broadcasting such as a Digital Multimedia Broadcasting (DMB) and a Digital Video Broadcasting (DVB)), a music replay function (e.g., an MP3), a photographing function, a data communication function, an Internet connection function, a near field communication function, and the like.

Further, as mobile communication services develop and a portable terminal becomes a necessity of citizens, recently, more and more users are informing others of an event (e.g., a first-birthday party, marriage, and advertisement, etc.) using a portable terminal. However, according to the prior art, user had to individually make a phone call or send a text message and an e-mail, etc. using a portable terminal, all of which is relatively inconvenient. Further, in the case in which an advertisement message is transmitted, such an advertisement message is transmitted to unspecified individuals regardless of their thinking. As such, according to the existing message transmission method, it is difficult to expect the effects of advertisement exposure or information provision, and the recipient user may feel unpleasant due to the receipt of spam.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and system for transmitting and receiving an event message, which registers phonebook data stored in user's terminal in a server, and which transmits an event message to user having mutually registered phonebook data (or to users that are otherwise mutually registered) when an event message transmission is requested.

Another aspect of the present invention is to provide a method and system for transmitting and receiving an event message, which can improve the effect of exposing an event message by displaying the event message related with the opponent when a call is requested.

Still another aspect of the present invention is to provide a method and system for transmitting and receiving an event message which informs user of the existence of an event message based on a phonebook.

In accordance with an aspect of the present invention, a system for transmitting and receiving an event message is provided. The system includes a transmitting terminal that generates an event message, and that transmits the event message and caller information, an event message service server that stores phonebook data after receiving the phonebook data transmitted from at least one terminal, that searches for a receiving terminal including the caller information in the phonebook data among receiving terminals included in the phonebook data of the transmitting terminal when receiving the event message, and that transmits the event message to the searched receiving terminal, and a receiving terminal that receives an event message transmitted by the event message service server, and informs its user of reception of the event message.

In accordance with another aspect of the present invention, a method for transmitting and receiving an event message is provided. The method includes storing phonebook data after receiving the phonebook data transmitted from at least one terminal, receiving the event message, checking caller information corresponding to a transmitting terminal that transmitted the event message, searching phonebook data of one or more receiving terminals stored in the phonebook data of the transmitting terminal, determining whether the phonebook data of the searched receiving terminals includes the caller information, and transmitting the event message to the receiving terminal if the searched phonebook data includes the caller information.

According to a method and system for transmitting and receiving an event message according to an exemplary embodiment of the present invention, an event message such as a first-birthday party, a wedding ceremony, and the like may be transmitted to mutually registered other users. Further, according to an exemplary embodiment of the present invention, a marketing event message such as a discount coupon, a new product introduction event, news release, time sale information, and the like may be transmitted to a multiple of users who have stored business information (e.g., a company name and a phone number, etc.). As such, because companies can transmit an event message to multiple users who have stored the company information (i.e., not unspecified individuals), the advertisement effect can be maximized, and because an event message is not indiscreetly transmitted, the cost of transmitting a message can be reduced. Further, the users can receive event messages related with other users (an individual or a company) whose number the user has stored in its corresponding phonebook. As such, reception of a spam text message can be prevented. Further, according to an exemplary embodiment of the present invention, a reception of an event message is informed by interworking with the phonebook, and thus a separate application program for managing an event message is not necessary.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
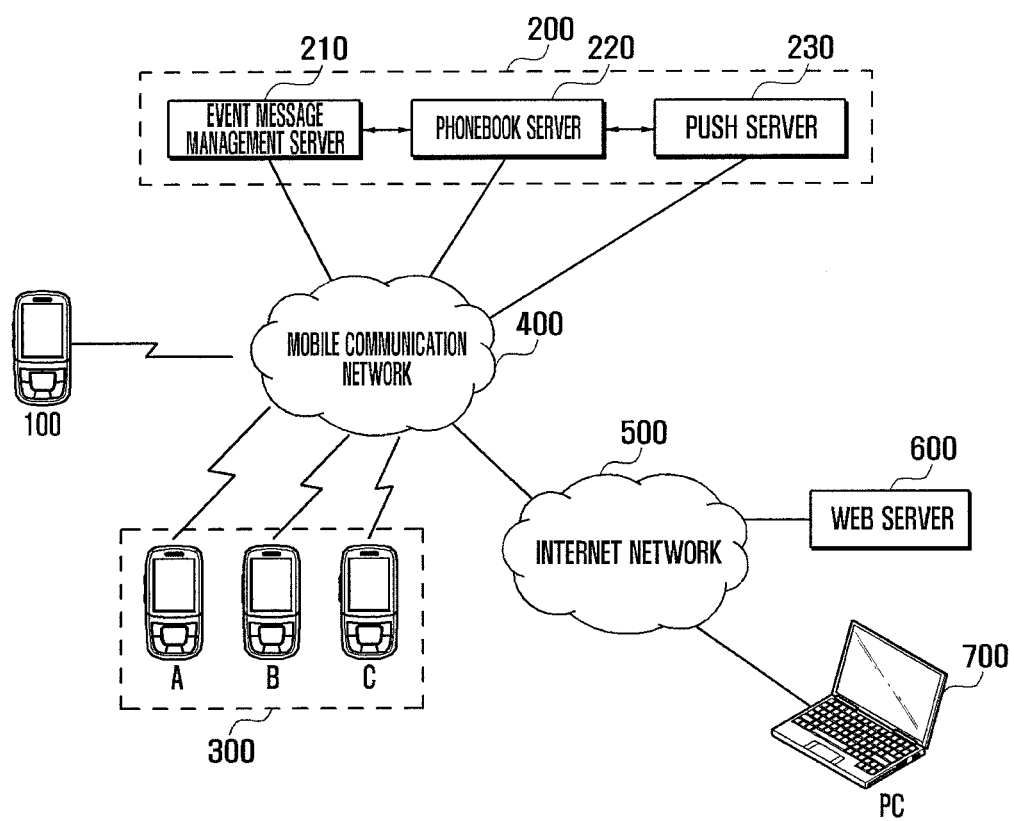
FIG. 1 schematically illustrates a system for transmitting and receiving an event message according to an exemplary embodiment of the present invention.

FIG. 1 schematically illustrates a system for transmitting and receiving an event message according to an exemplary embodiment of the present invention.

Referring to FIG. 1, a system for transmitting an event message may include a transmitting terminal 100, an event message service server 200, a receiving terminal 300, a mobile communication network 400, an Internet network 500, a web server 600, and a Personal Computer (PC) 700.

The transmitting terminal 100 generates and transmits an event message, and the receiving terminal 300 receives an event message. The event message may include a personal event message and/or a company event message. The personal event message may relate to, for example, a birthday party, a wedding ceremony, and the like. A company event message may be an advertisement. For example, the company event message may be related to a coupon, a news release/update, a new product introduction, and the like. The transmitting terminal 100 and the receiving terminal 300 may be a portable terminal capable of transmitting and receiving a message (e.g., a text message and a multimedia message, and the like). For example, a portable terminal may be a mobile communication terminal, a tablet personal computer, a smart phone, and the like. The transmitting terminal 100 and the receiving terminal 300 can each transmit its own phonebook data to the event message service server 200.

The transmitting terminal 100 may provide an application for writing an event message. Further, in the case that an Internet connection function is provided, the transmitting terminal 100 may operate in a manner that is similar to a Personal Computer (PC) 700 connected to a web server 600. That is, the transmitting terminal 100 may provide a web page screen for generating an event message.

Further, the transmitting terminal 100 and the receiving terminal 300 are relative concepts. That is, the transmitting terminal 100 can play a role of the receiving terminal 300, and the receiving terminal 300 can play a role of the transmitting terminal 100 depending on the situation. In other words, a terminal may function as both a transmitting terminal 100 and a receiving terminal 300 based on the context in which the terminal is being operated.

The event message service server 200, which is a server for managing transmission and reception of an event message, can receive phonebook data transmitted from one or more terminals (e.g., including a transmitting terminal 100, a receiving terminal 300, and a PC 700), and store the phonebook data. For example, the event message service server 200 can receive and update phonebook data transmitted from an individual and/or a company. The event message server 200 can search for a receiving terminal 300 including caller information in the phonebook data among receiving terminals 300 included in the phonebook data of the transmitting terminal 100 when receiving an event message, and transmit the event message to the searched receiving terminal 300. Further, in a case in which a company registers an event message through the PC 700, the event message server 200 may transmit the event message to at least one receiving terminal 300 which stores company information of the company which has registered the event message. For example, the event message service server 200 may transmit the event message by groups.

Such an event message service server 200 may include an event message management server 210, a phonebook server 220, and a push server 230. The event message management server 210 stores and manages event message information, the phonebook server 220 stores and manages phonebook data of the transmitting terminal 100, phonebook data of the receiving terminal 300 and phonebook data of the company, and the push sever 230 supports the update of an event message. The event message service server 200 may receive phonebook data transmitted from a multiple of terminals (or subscribers), compare phonebook data when receiving an event message, and transmit the event message if the phone number is mutually registered. Further, although FIG. 1 illustrates the event message management server 210, the phonebook server 220, and the push server 230 as being separate servers, the event message management server 210, the phonebook server 220, and the push server 230 may be integrated as one server.

The web server 600 provides a web service so that an event message can be generated and managed in a Personal Computer (PC) 700 rather than a transmitting terminal 100. For example, the PC 700 may be a notebook PC, a desktop PC, a netbook PC, or the like. The PC 700 may connect to a web page of the web server 600, generate an event message, and transmit the event message to the event message service server 200 through the mobile communication network 400. According to exemplary embodiments of the present invention, a company as well as an individual may transmit an event message (e.g., a company may transmit an event message such as an advertisement message such as a discount coupon and new product introduction news) using phonebook data through the PC 700 and the web server 600. For example, the company may transmit the phonebook data including phone numbers of customers based on the company name, to the phonebook server 220, and store and manage the phonebook data. Specifically, the company may register the company name and phone number in the phonebook server 220. As an example, the phonebook server 220 may automatically register the phonebook data of the company. A method of updating the phonebook of the company will be explained later in detail with reference to FIG. 3B.

Figure 2A:
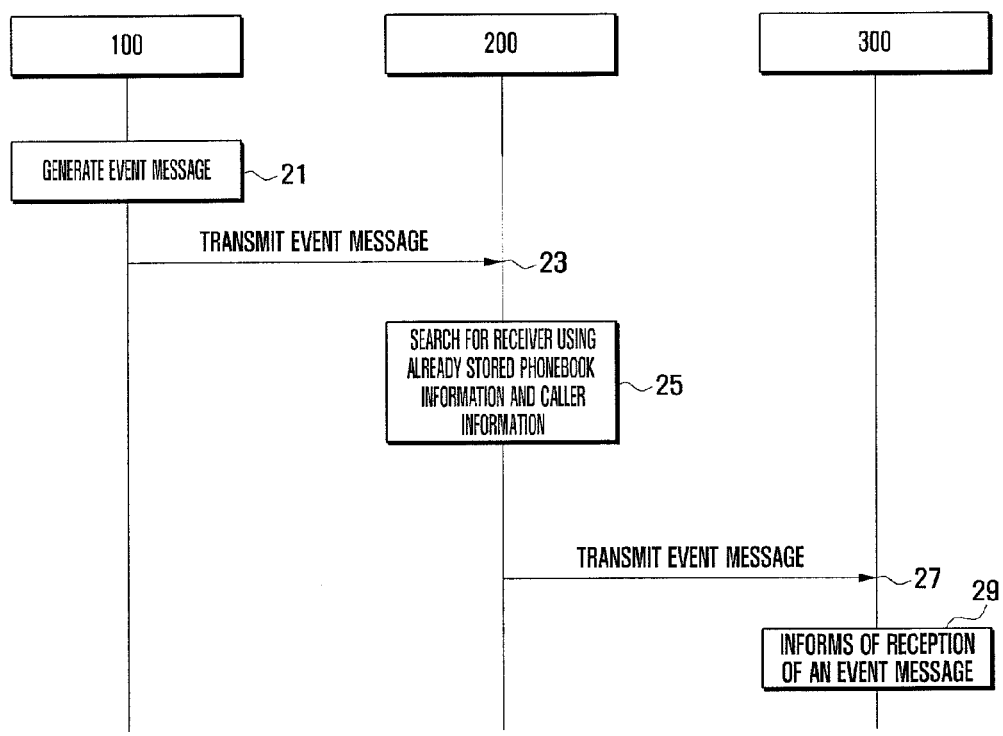
FIG. 2A is a flowchart schematically illustrating a method of transmitting an event message according to an exemplary embodiment of the present invention.

FIG. 2A is a flowchart illustrating a method of transmitting an event message according to an exemplary embodiment of the present invention.

Referring to FIG. 2A, the transmitting terminal 100 generates an event message (e.g., an individual event message or a company event message) according to a user's request at step 21, and transmits the generated event message to the event message server 200 at step 23. As an example, at this time, the transmitting terminal 100 may transmit caller information (e.g., the caller's phone number) together with the event message. The event message may be generated through an application program or a web page for generation of an event message. The method of generating the event message will be explained later in detail with reference to FIGS. 5, 6A and 6B. The event message service server 200 may search for a receiver using caller information at step 25. Specifically, the event message service server 200 can store an event message in the event message management server 210, and transmit the caller information (e.g., the phone number) to the phonebook server 220. The phonebook server 220 may search for phonebook data of the caller corresponding to the caller information, and extract at least one set of receiver information. For example, the phonebook server 220 can extract at least one set of receiver information stored in the phone data corresponding to the caller information. Thereafter, the phonebook server 220 may determine whether the phonebook data of preliminary receivers corresponding to each set of the receiver information includes caller information. In other words, the phonebook server 220 may confirm whether the caller information is included in phonebook data of a preliminary receiver corresponding to each set of receiver information. If the phonebook data of the preliminary receivers includes caller information, then the phonebook server 220 may determine an actual receiver. For example, the phonebook server 220 may determine the receiving terminal 300 to be the actual receiver.

The push server 230 of the event message service server 220 transmits an event message to at least one determined receiving terminal 300 at step 27. The receiving terminal 300 informs user of the fact that an event message has been received at step 29. For example, the receiving terminal 300, which has received the event message, can notify its user that an event message has been received through an icon display, a sound output, and a vibration generation, etc. Such a method of receiving an event message will be explained later in detail with reference to FIG. 7.

According to exemplary embodiments of the present invention, a method of transmitting an event message is not limited to transmitting the event message using the transmitting terminal 100. For example, a user can generate and transmit an event message using a PC 700.

Figure 2B:
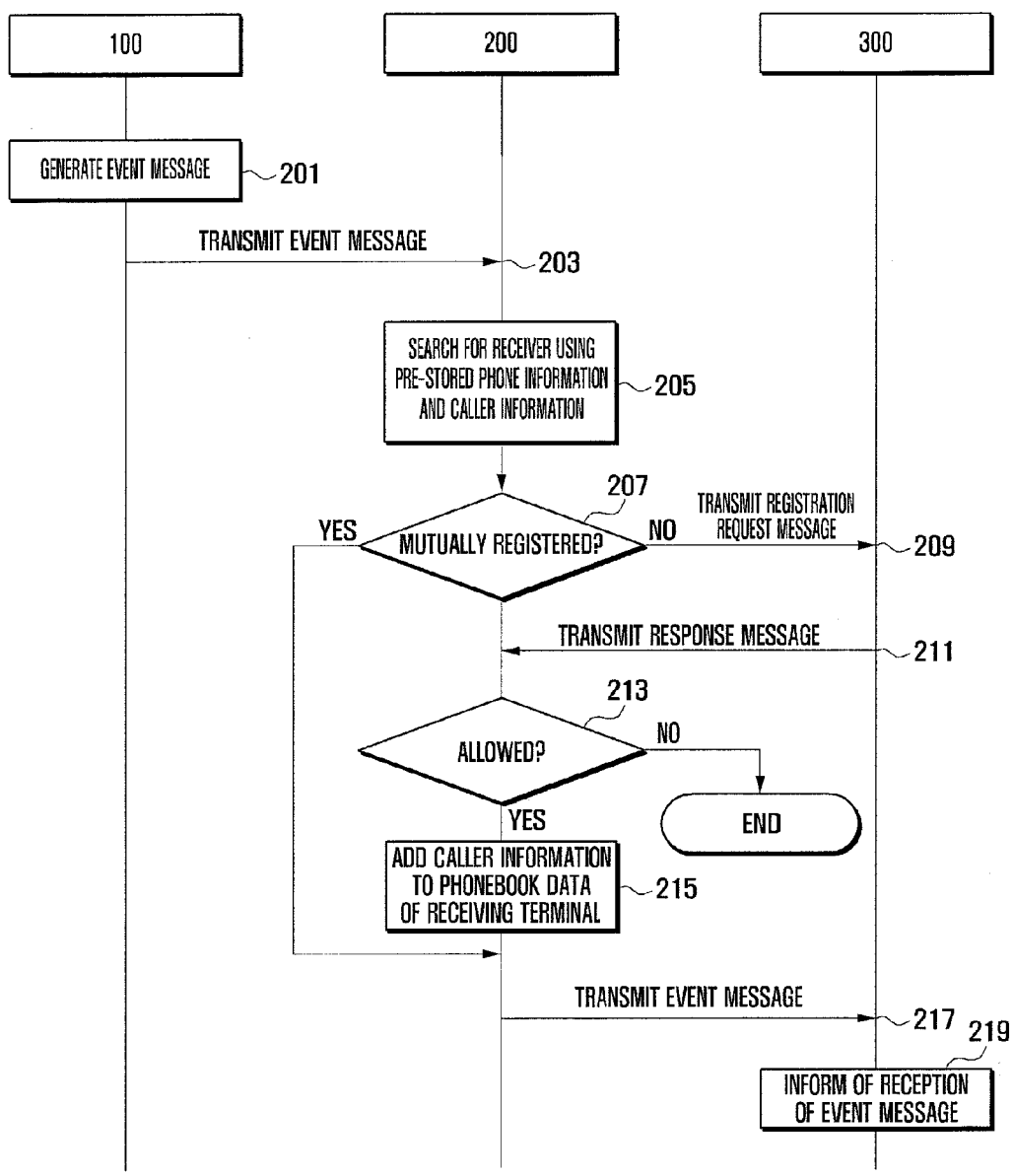
FIG. 2B is a flowchart illustrating a method of transmitting an event message according to an exemplary embodiment of the present invention.

FIG. 2B is a flowchart illustrating a method of transmitting an event message according to an exemplary embodiment of the present invention.

Referring to FIG. 2B, the transmitting terminal 100 generates an event message (e.g., an individual event message or a company event message) according to user's request at step 201, and transmits the generated event message to the event message service server 200 at step 203. The transmitting terminal 100 may transmit caller information (e.g., the caller's phone number) together with the event message. The event message may be generated through an application program or a web page for generation of an event message. The method of generating the event message will be explained in detail later with reference to FIGS. 5 6A and 6B. The event message service server 200, which received the event message, may search for a receiver using caller information at step 205. Specifically, the event message server 200 may store an event message in the event message management server 210, and transmit caller information (e.g., the phone number) to the phonebook server 220. The phonebook server 220 may extract at least one set of receiver information stored in the phone data corresponding to the caller information, and confirm whether the caller information is included in phonebook data of a preliminary receiver corresponding to each set of receiver information.

The phonebook server 220 can confirm whether the caller and the receiver are mutually registered using the confirmation result at step 207. In case mutually registered, the event message service server 200 can move to step 217 which will be explained later. In contrast, if the caller and the receiver are not mutually registered, then the event message service server 200 may transmit a registration request message, which requests registration of caller information to the preliminary receiver, to the receiving terminal 300 at step 209. The receiving terminal 300 may transmit a response message to the registration request message to the event message service server 200 at step 211. The event message service server 200, which received the response message, may confirm whether the registration request has been accepted through the response message at step 213. If the registration request has not been accepted at step 213, then the event message service server 200 may stop transmitting the event message. In contrast, if the registration request has been accepted at step 213, then the event message service server 200 may add caller information to the phonebook data of the receiver at step 215. The push server 230 of the event message service server 200 transmits the event message to the mutually registered receiving terminal 300 at step 217. The receiving terminal 300 informs user of the fact that an event message has been received at step 219. For example, the receiving terminal 300, which received the event message, may inform its user that an event message has been received through an icon display, sound output, and vibration generation, etc. That is, the receiving terminal 300, which received the event message, can inform its user of the reception of the event message through at least one of visual, auditory, and tactile methods.

Further, it was explained above that when searching for the receiver, the phonebook data of the receiver included in the phonebook data is searched. However, according to exemplary embodiments, the method of searching for the receiver may include other or alternative searches. For example, the phonebook server 220 may additionally search for a receiver using the caller's phone number. That is, the phonebook server 220 may search phonebook data of users which do not exist in the caller's phonebook, and transmit the event message to receivers who registered the caller in their phonebooks.

Further, according to exemplary embodiments of the present invention, a method of transmitting an event message is not limited to transmitting the event message using the transmitting terminal 100. For example, a user can generate and transmit an event message using a PC 700.

Figure 3A:
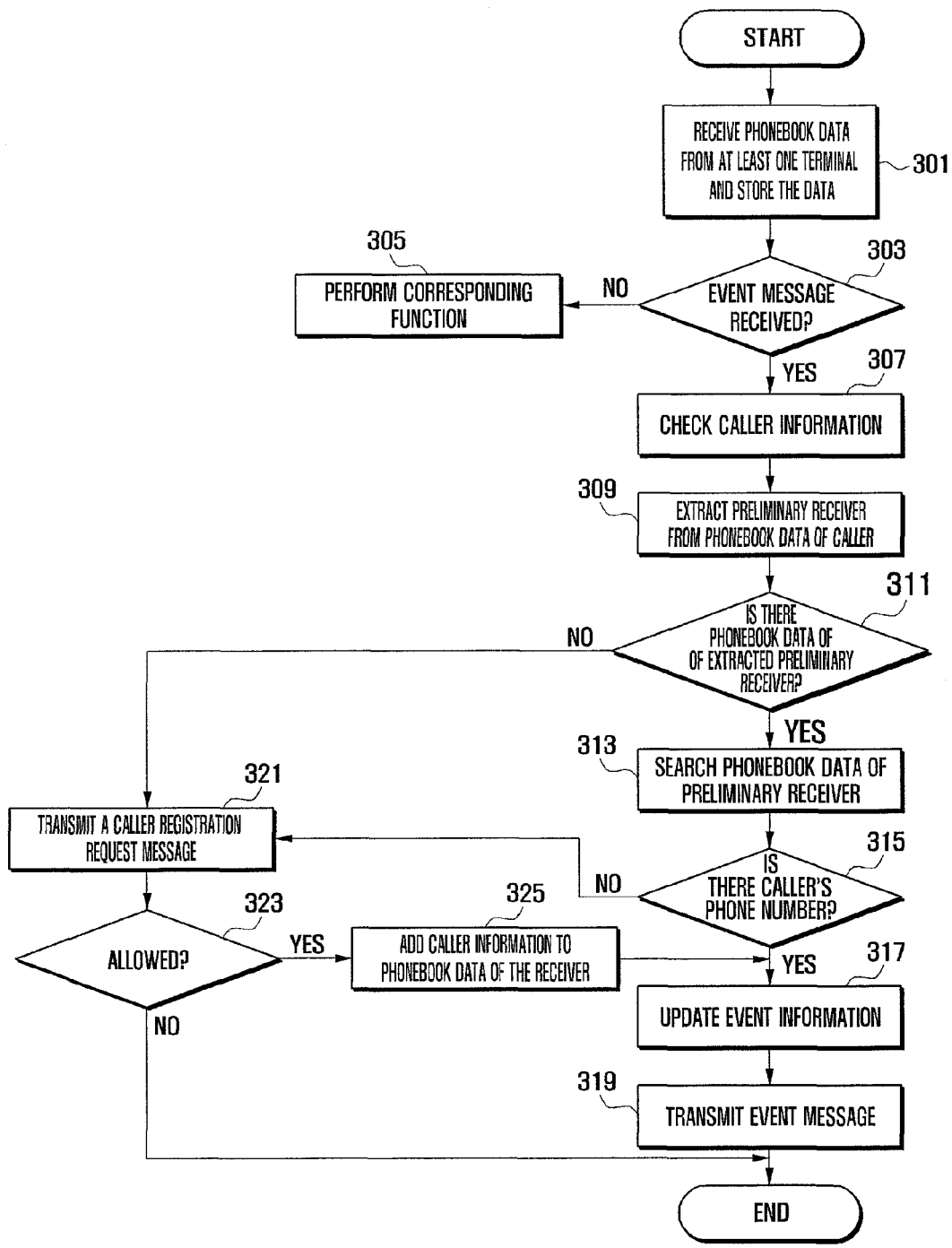
FIG. 3A is a flowchart illustrating a method of searching for a receiver to which an event message is to be transmitted by a system according to an exemplary embodiment of the present invention.

FIG. 3A is a flowchart illustrating a method of searching for a receiver to which an event message is transmitted by a system according to an exemplary embodiment of the present invention.

Referring to FIG. 3A, the phonebook server 220 can receive phonebook data transmitted from at least one terminal, and store the received phonebook data at step 301. The phonebook data can be periodically synchronized and managed.

The phonebook server 220 determines whether an event message is received at step 303. If an event message is not received, then the phonebook server 220 can perform a corresponding function at step 305. For example, the phonebook server 220 may perform phonebook data synchronization or maintain a standby state. In contrast, if an event message is received, then the phonebook server 220 can check information of a caller that has transmitted an event message at step 307, and extract preliminary receivers from the phonebook data of the caller at step 309.

The phonebook server 220 determines whether there is phonebook data of the extracted preliminary receivers at step 311. If phonebook data of the extracted preliminary receivers do not exist, then the phonebook server 220 may terminate a receiver search by moving to step 321 which will be explained later. In contrast, if phonebook data of the extracted preliminary receivers exist, then the phonebook server 220 may search phonebook data of preliminary receivers at step 313, and determine whether there is the caller's phone number in the phonebook data of the preliminary receivers at step 315. If there the caller's phone number is in the phonebook data of the preliminary receivers, then it is determined that the preliminary receiver is an actual receiver, and the phonebook server 220 may request the event message management server 210 to update event message at step 317. The event message management server 210 may transmit the event message to the receiving terminal through the push server 230 at step 319.

Further, if the caller's phone number does not exist in the phonebook data of the preliminary receiver at step 315, then the phonebook server 220 may transmit a call information registration request message to the receiving terminal at step 321. Thereafter, the phonebook server 220 may determine whether an allowance message is received from the receiving terminal at step 323. If an allowance message is received (e.g., if the phonebook server 220 is allowed to register a receiving terminal), then caller information (e.g., a phone number, a name, and the like) may be added to the phonebook data of the receiver at step 325. Therefore, the phonebook server 220 moves to above-described step 317. Further, if an allowance message is not received (of if the phonebook server 220 is not allowed to register a receiving terminal), then the phonebook server 220 does not transmit the event message to the receiving terminal.

Further, it was explained above that when searching for the receiver, the phonebook data of receivers included in the caller's phonebook data are searched. However, exemplary embodiments of the present invention are not limited to this example. For example, according to exemplary embodiments of the present invention, the phonebook server 220 can additionally or alternatively search for a receiver using the caller's phone number. Specifically, the phonebook server 220 may search receiving terminals, which do not exist in the caller's phonebook data, but which registered the caller in the phonebook, and may transmit the event message to the receiving terminal. Such a method may be useful in transmitting, for example, an advertisement message of a company. That is, an advertisement message is not indiscreetly transmitted using personal information. Rather, the advertisement message may be transmitted only to users that store the company's phone number, through which the company can save the advertisement message transmission costs. Further, the company can enhance the advertisement effects by transmitting an event message to customers who are interested in the company.

Figure 3B:
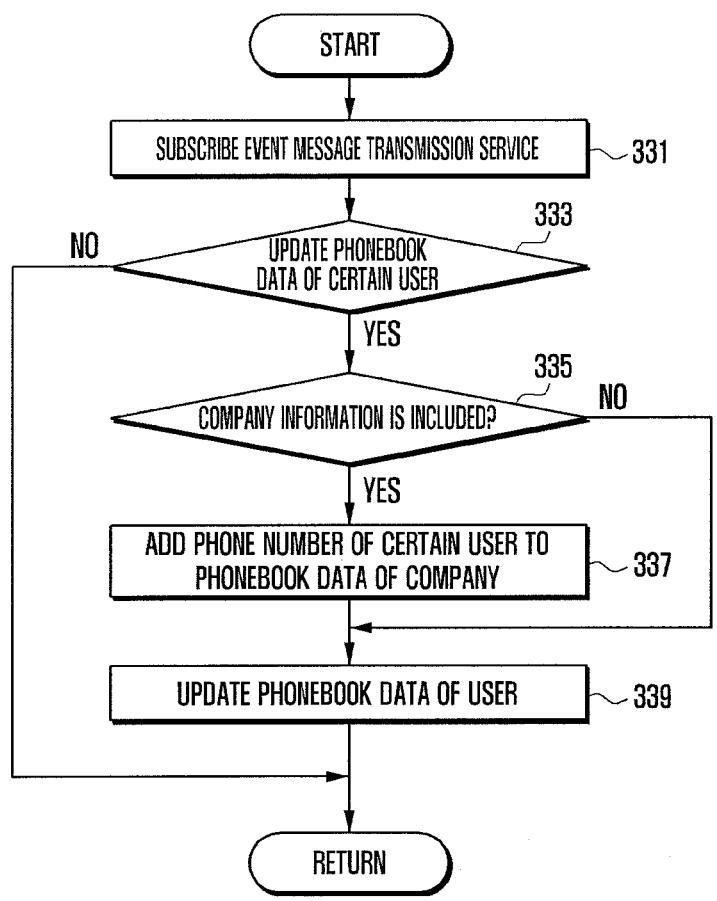
FIG. 3B is a flowchart illustrating a method of updating a phonebook of a company in a system according to an exemplary embodiment of the present invention.

FIG. 3B is a flowchart illustrating a method of updating a phonebook of a company in a system according to an exemplary embodiment of the present invention.

Referring to FIG. 3B, a company, which desires to use an event message transmission service may subscribe to the event message transmission service at step 331. For example, a company, which is registered in the event message transmission service, can register customer information (e.g., a phone number, an e-mail address, and the like) held by the company. That is, the company can register customer information in the phonebook server 220 of the event message service server 200.

The phonebook server 220 may determine whether the phonebook data of a certain user is updated at step 333. For example, the phonebook server 220 may determine whether phonebook data has been added to the user's phonebook. To this end, the phonebook data of the registered multiple of users can be periodically synchronized.

If the phonebook data update of the user is not sensed, then the phonebook server 220 may return to step 333 at which the phonebook server 220 determines whether the phonebook data of a certain user is updated. In contrast, if the phonebook data update of the user is sensed, then the phonebook server 220 can determine whether the added phonebook data includes company information (e.g., at least one of the company name and the phone number) at step 335. To this end, the phonebook server 220 can extract the phone number and the registered name from the added phonebook data, compare the extracted information with the company information, and confirm whether there is matched company information.

As a result of the comparison between the extracted information and the company information, if the added phonebook data does not include company information, then the phonebook server 220 can update user's phonebook data at step 339. In contrast, if the added phonebook data includes company information, the phonebook server 220 can automatically update the phonebook data of the company by adding the phone number of the certain user to the phonebook data of the company at step 337, and can update the user's phonebook data at step 339. If the update of the phonebook data of the company and the user is completed, the phonebook server 220 can return to step 333 at which the phonebook server 220 determines whether the phonebook data of a certain user is updated, and repeat the above-explained process.

Further, although an exemplary embodiment of the present invention including automatically adding the user's phone number to the phonebook data of the company has been described, the present invention is not limited to such embodiments. For example, if company information is deleted from a user's phonebook data, the phonebook server 220 can delete user information from the phonebook data of the company.

Figure 4:
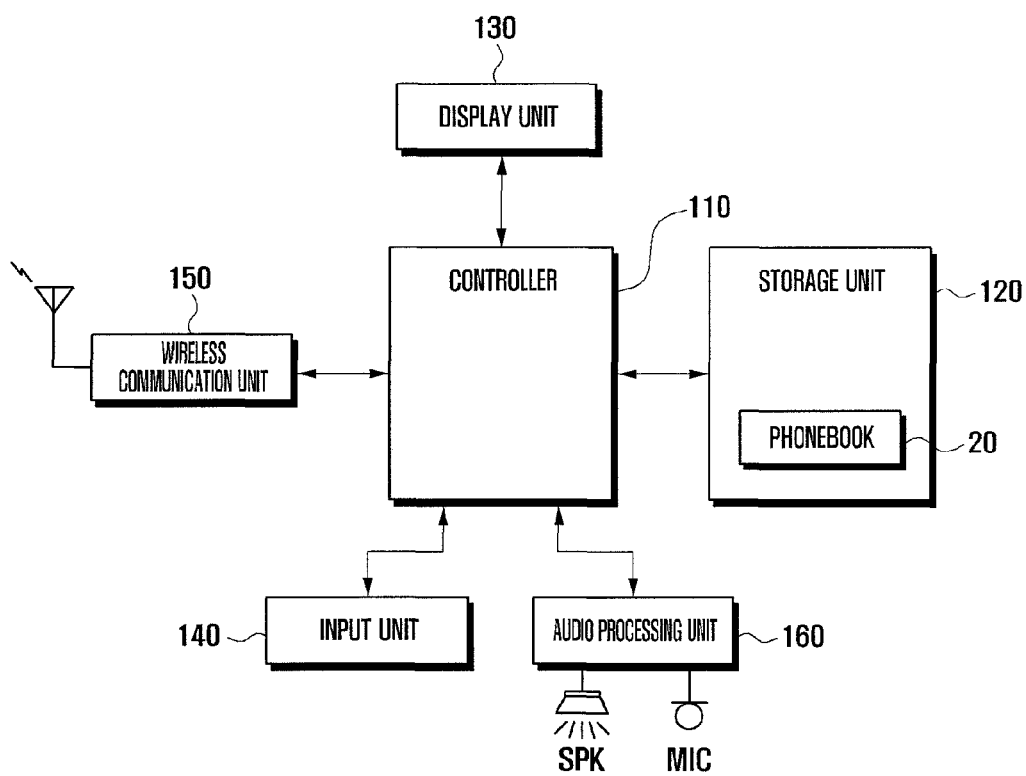
FIG. 4 is a block diagram schematically illustrating the constitution of a portable terminal according to an exemplary embodiment of the present invention.

FIG. 4 is a block diagram schematically illustrating the constitution of a portable terminal according to an exemplary embodiment of the present invention. At this time, the portable terminal 100/300 can play a role of a transmitting terminal 100 and a receiving terminal 300. Hereinafter, an example of the portable terminal is illustrated for the convenience of explanation.

Referring to FIG. 4, the portable terminal 100/300 can include an audio processing unit 160, a wireless communication unit 150, an input unit 140, a display unit 130, a storage unit 120 and a controller 110. The storage unit 120 can store a phonebook 20.

The audio processing unit 160 may transmit and receive audio signals, and may be formed as a sound part that encodes and decodes the signals. Such an audio processing unit 160 may include a CODEC, an audio amplifier, etc. The audio processing unit 160 is connected with a microphone (MIC) and a speaker (SPK). The audio processing unit 160 converts analog voice signals inputted from the microphone to digital voice signals, generates data for the signals, and transmits the generated data to the controller 110. Further, the audio processing unit 160 can convert digital voice signals to analog voice signals, and output the converted signals through the speaker (SPK). Further, the audio processing unit 160 can output various audio signals generated in the portable terminal 100/300 through the speaker (SPK). For example, the audio processing unit 160 can output an MP3 file and audio signals according to the moving picture file replay through the speaker. In particular, the audio processing unit according to an exemplary embodiment of the present invention can output an effect sound that informs of reception of an event message.

The wireless communication unit 150 can form a communication channel for calling and a communication channel for data transmission. That is, the wireless communication unit 150 can form a voice call channel, a video call channel and a data communication channel, etc. with a base station. The wireless communication unit 150 can transmit voice signals and video signals to the opponent terminal through the voice call channel and the video call channel under the control of the controller 110, or receive voice signals and video signals from the opponent terminal. The wireless communication unit 150 can include a wireless frequency transmission unit (not shown) that up-converts and amplifies the frequency of the transmitted signal, a wireless frequency reception unit (not shown) that low-noise-amplifies the received signal and low-converts the frequency, and a transmission and reception separation unit (not shown) that separates the received signal and the transmitted signal. In particular, the wireless communication unit 150 according to an exemplary embodiment of the present invention can transmit an event message to the event message service server 200, or receive the event message from the event message service server 200. Further, the wireless communication unit 150 can transmit phonebook data to the event message service server 200, and periodically synchronize phonebook data. When the portable terminal 100/300 is operated as a receiving terminal 300, the wireless communication unit 150 can receive a request message to add caller information from the phonebook server 220 of the event message service server 200, and transmit a response message thereto to the event message service server 200. Further, the wireless communication unit 150 can form a communication channel with a web server 600 through a mobile communication network 400 and an Internet network 500. Further, the wireless communication unit 150 can form a communication channel with the web server 600 using a near field wireless communication network (not shown) like Wi-Fi or a wired Internet network through a wired cable. As an example, the portable terminal 100/300 can operate like a PC 700 as explained above.

The input unit 140 receives the input of numbers and various letters, and can include input keys and functions keys for setting various functions and controlling functions of the portable terminal 100/300. For example, the input unit 140 can include a calling key for a voice call request, a video call key for a video call request, a termination key for requesting termination of a voice call or a video call, a volume key for adjusting the output volume of audio signals, and a direction key. In particular, the input unit 140 according to an exemplary embodiment of the present invention can transmit signals related with generation of an event message and an output request of the received event message to the controller 110. Such an input unit 140 can be formed as one or a combination of input units such as a touch pad, a touch screen, a button-type key pad, a joystick, a wheel key, and the like.

The display unit displays information inputted by user and information to be provided to user as well as various menus of the portable terminal 100/300. For example, the display unit 130 can provide various screens according to the use of the portable terminal 100/300 such as a standby screen, a message writing screen and a calling screen, etc. In particular, the display unit 130 according to an exemplary embodiment of the present invention can display an event message generation screen for event message generation, an event message reception screen, and a screen of outputting the received event message, etc., which will be explained in detail later with reference to FIGS. 6A, 6B, 7 and 9. The display unit 130 may be formed as a Liquid Crystal Display (LCD), an Organic Light Emitted Diode (OLED), and an Active Matrix Organic Light Emitted Diode (AMOLED), and/or the like. Further, if the display unit 130 is formed as a touch screen, the display unit 130 can function as an input unit 140.

The storage unit 120 can store user data as well as programs that are necessary for operating functions according to an exemplary embodiment of the present invention. For example, the storage unit 120 can store a program for controlling general operations of the portable terminal 100/300, an Operating System (OS) for booting the portable terminal 100/300, an application program that is necessary for other options functions such as a camera function, a sound replay function, an image or moving picture replay function, a near field communication function, and the like. Further, the storage unit 120 may store user data generated according to the use of the portable terminal 100/300, such as a text message, a game file, a music file, a movie file, and the like. In particular, the storage unit 120 according to an exemplary embodiment the present invention can store a phonebook 20. The phonebook is transmitted to the phonebook server 220 of the event message service server 200, and is synchronized and managed. Further, the storage unit 120 can store an application program for generation of an event message. As an example, the application program can be separately provided. As another example, the event message generation application program can be included in the phonebook application program. That is, the phonebook application program of the portable terminal 100 according to an exemplary embodiment of the present invention can include a routine which manages phonebook information and a routine which manages generation and reception of the event message. Likewise, if an event message generation application program is included in the phonebook application program, the phonebook 20 can be linked with the event message and can be managed. For example, when outputting the phonebook list, an indication as to whether an event message exists may be displayed for each item of the list. Whether the event message exists may be indicated by a number-type icon, which will be explained later in detail.

The controller 110 can control general operations of the portable terminal 100/300 and a signal flow between internal blocks of the portable terminal 100/300. In particular, the controller 110 according to an exemplary embodiment of the present invention can control generation of an event message, reception of the event message, and the display of the event message. The controller 110 will be explained later in detail with reference to FIGS. 5 to 9.

Though not illustrated in FIG. 4, the portable terminal 100/300 according to an exemplary embodiment of the present invention can further selectively include components for providing additional functions, such as a camera module for taking an image or a moving picture, a broadcast receiving module for receiving a broadcast, a digital sound source replay module like an MP3 module, a near field wireless communication module for a near field wireless communication, and a proximity sensor module for proximity sensing, etc. Not all such components can be listed here because they can be modified in various ways according to the convergence trend, however, the portable terminal 100/300 according to an exemplary embodiment of the present invention can further include components of the same level as that of the above mentioned components.

Figure 5:
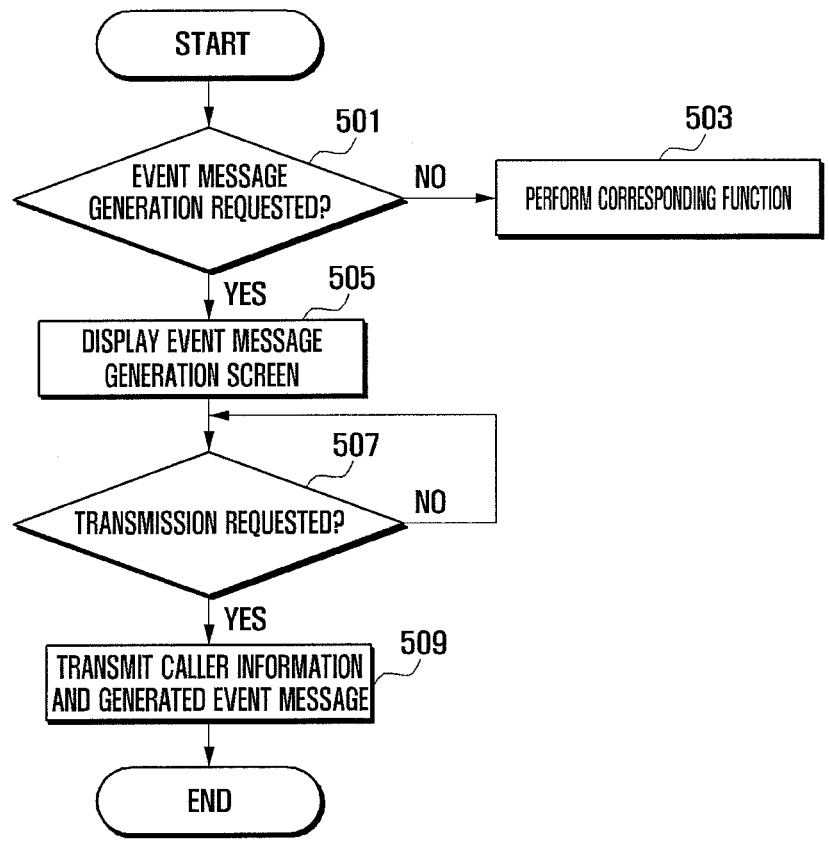
FIG. 5 is a flowchart illustrating a method of generating an event message according to an exemplary embodiment of the present invention.
Figure 6A:
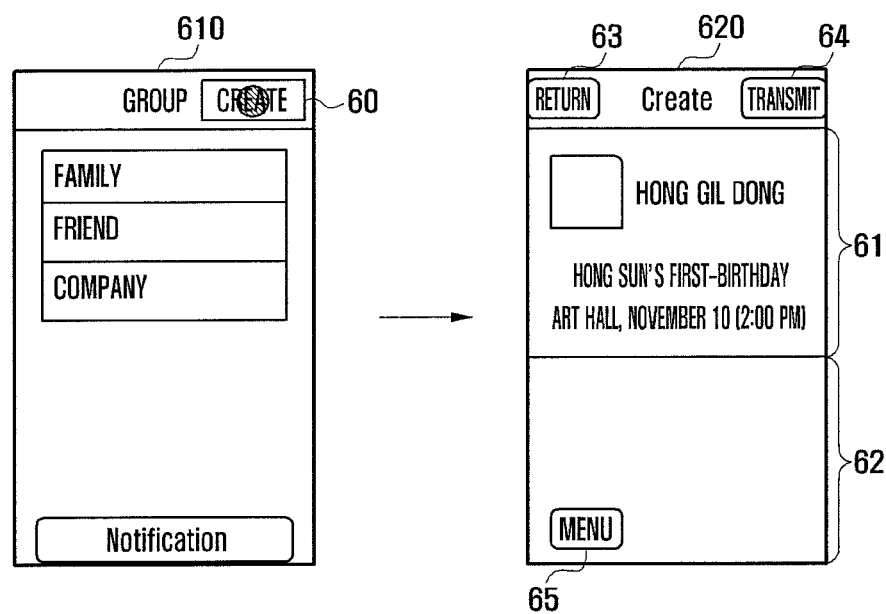
FIG. 6A is a screen example illustrating a method of generating an event message using a phonebook screen according to an exemplary embodiment of the present invention.
Figure 6B:
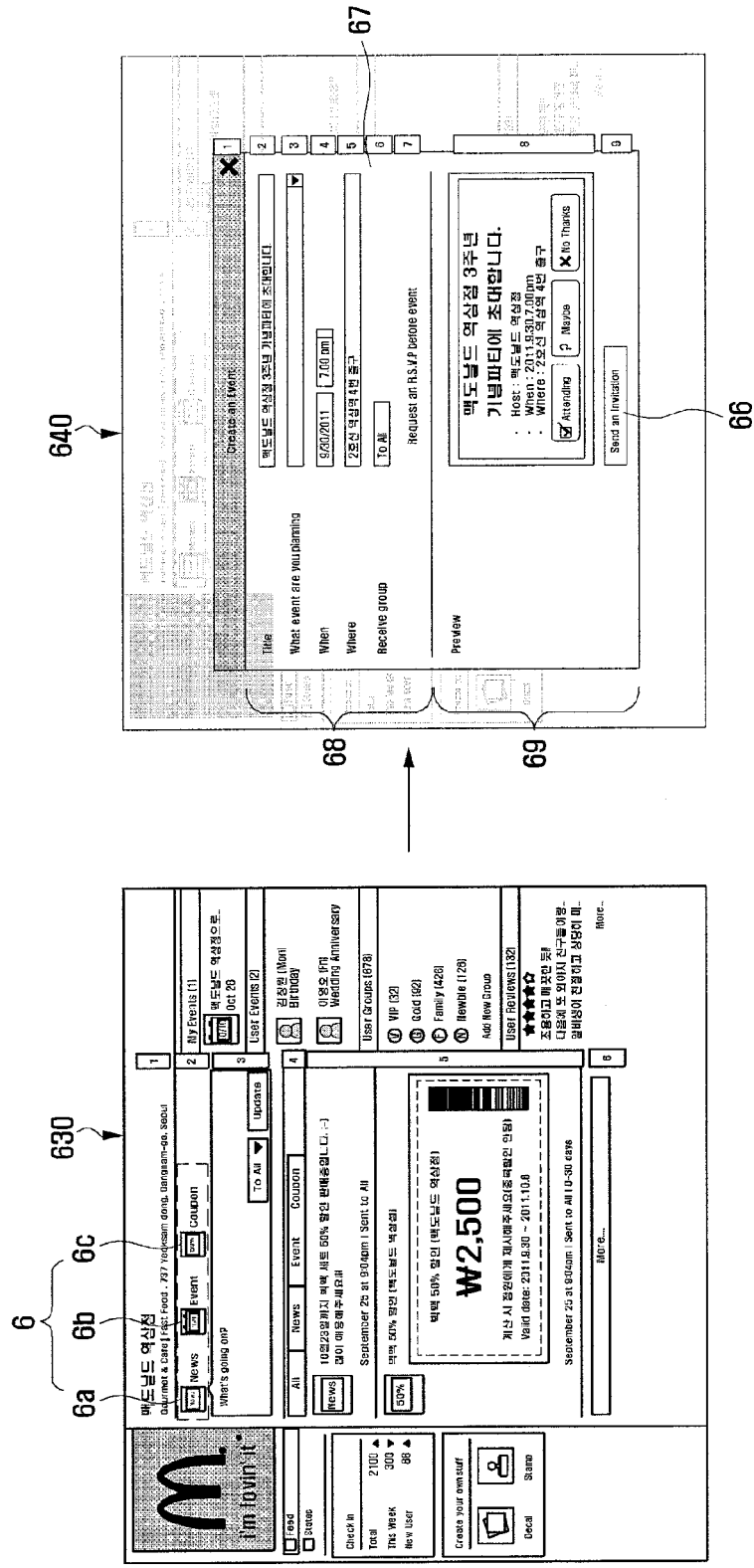
FIG. 6B is a screen example illustrating a method of generating an event message using a web page according to an exemplary embodiment of the present invention.

FIG. 5 is a flowchart illustrating a method of generating an event message of a portable terminal according to an exemplary embodiment of the present invention. FIG. 6A is a screen example illustrating a method of generating an event message using a phonebook according to an exemplary embodiment of the present invention, and FIG. 6B is a screen example illustrating a method of generating an event message using a web page according to an exemplary embodiment of the present invention. Hereinafter, a case of connecting to a web page for generating an event message in a portable terminal will be explained as an example. Further, it is appreciated that the method of generating an event message can be applied to a notebook PC, a desktop PC and a tablet PC, etc.

Referring to FIGS. 4 to 6B, the controller 110 determines whether an event message generation request is generated at step 501. The event message generation request may be generated through a preset shortcut key input or a menu. For example, the event message generation request can be generated when touching "Create" menu 60 which is positioned at the upper right side of the phonebook screen of a portable terminal as illustrated in the screen example of reference numeral 610 of FIG. 6A.

Further, if a user connects to a web page for generation of an event message using the Internet connection function, the event message generation request can be generated when selecting an event message generation menu 6 which is positioned at one end of the web page screen as illustrated in the screen example of reference numeral 630 of FIG. 6B. For example, the event message generation menu 6 may include a news menu 6a, an event menu 6b, and a coupon menu 6c according to the type of the event message. However, exemplary embodiments of the present invention are not limited to this example. That is, the event message generation menu 6 may be variously set according to designer's intention. Further, the event message generation screen may further include an event message history which is generated and transmitted by the company, information of customers who have a plan for an event (e.g., a birthday, a wedding anniversary, etc.), and group information. At this time, the company can generate an event message by selecting a customer with an event plan or a certain group.

If the event message generation signal is not generated, then the controller 110 can perform a corresponding function at step 503. For example, the controller 110 can perform a music replay function, a file transmission function, and a broadcast replay function, etc. or maintain the standby state according to the user's request. In contrast, if the event message generation request signal is generated, then the controller 110 can control the display unit 130 to output an event message generation screen at step 505. For example, the display unit 130 can output an event message generation screen as illustrated in the screen example corresponding to reference numeral 620 of FIG. 6A. The event message generation screen may include a text message input area 61, an image attachment area 62, a return menu 63 that returns to the previous step, a first transmission menu 64 that requests transmission of a written event message. The event message generation screen may also include a slide menu that includes a sub-menu such as selection of an image to be attached and selection of special characters. The screen example of the reference numeral 620 shows a case where a first-birthday party invitation message is written.

Further, according to an exemplary embodiment of the present invention, if one of the event message generation menus 6 is selected from a web page screen, the controller may pop up an event message generation window 67 as illustrated in the screen example of reference numeral 640. The event message generation widow 67 may include an event message setting area 68 including an area for inputting an event time, an area for selecting an event type, an area for setting an event date, an area for inputting an event place, an area for selecting a receiving group, and a preview area 69 showing the generated event message in advance.

The controller 110 determines whether a transmission request is inputted at step 507, and maintains step 507 if case the transmission request is not inputted. In contrast, if the transmission request is inputted, the controller 110 can transmit a generated event message to the event message service server 200 at step 509. For example, if a first transmission menu 64 is selected from the phonebook screen of the screen example of reference numeral 620, or a second transmission menu 66 of the event message generation window 67 of the screen example of reference numeral 640 is selected, then the controller 110 can transmit the generated event message to the event message service server 200 so that the event message can be transmitted to the receiving terminal 300. According to an exemplary embodiment of the present invention, in a method of generating an event message using a web page, if a second transmission menu 66 is selected from the event message generation window 67 of the screen, then the controller 110 can operatively transmit, and/or coordinate or otherwise cause a web server to transmit, the generated event message to the event message service server 200 so that the event message can be transmitted to the receiving terminal 300.

Even though the above-described event message generation according to an exemplary embodiment of the present invention does not input receiver information unlike a general message input, the phonebook server 220 searches for receivers to whom an event message is to be transmitted by comparing phonebook data, and the event message can be transmitted to the searched receiving terminals, thereby improving user's convenience.

The receiver of the event message is determined in the event message service server 200 as described above with reference to FIGS. 1 to 3B.

Further, the generation of an event message in a portable terminal 100 has been explained as an example, but exemplary embodiments of the present invention are not limited to this example. For example, it is possible to generate the event message by connecting to the web server that manages generation and registration, etc. of the event message using the Personal Computer (PC) 700.

Figure 7:
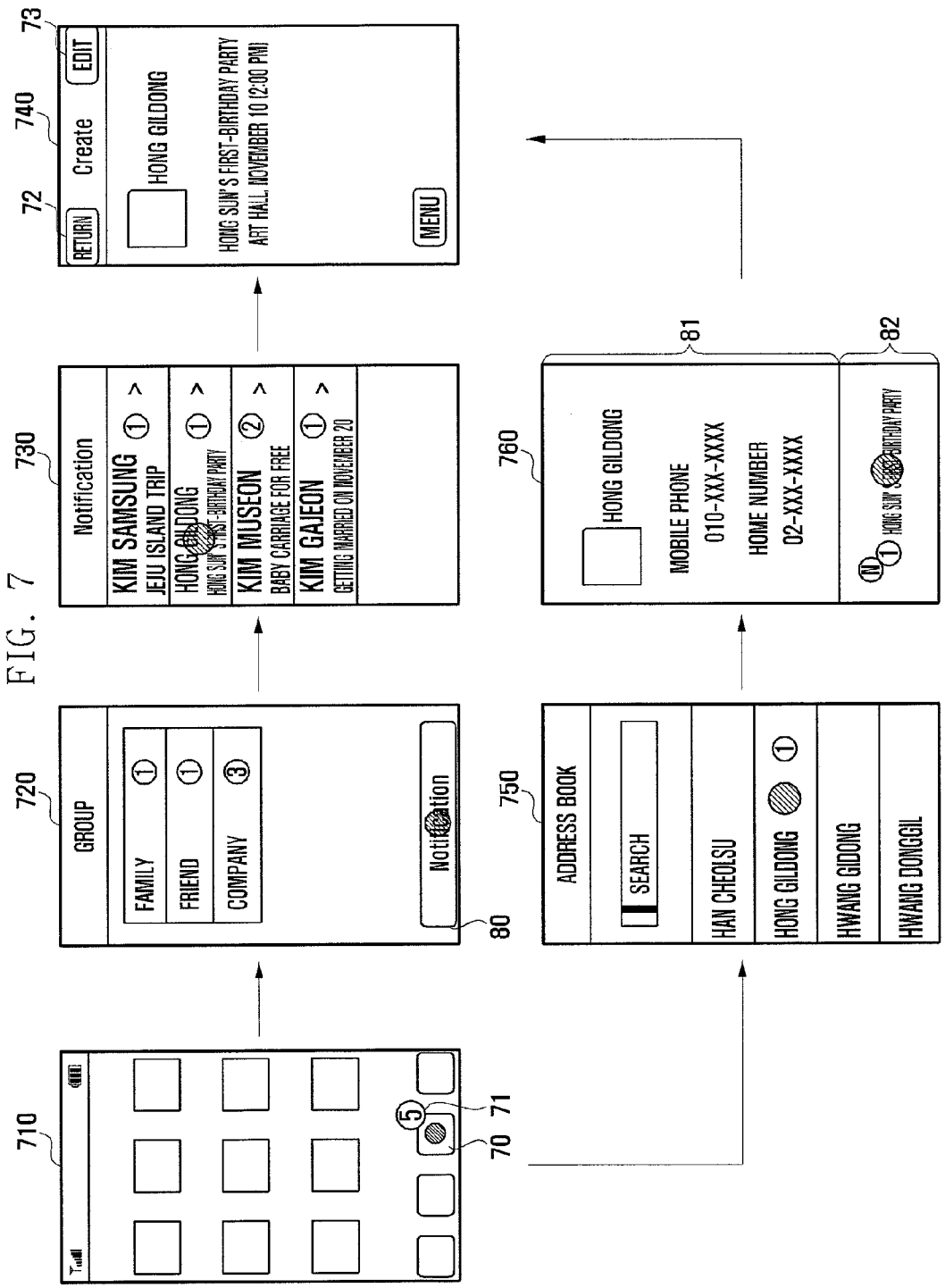
FIG. 7 is a screen example illustrating a method of receiving an event message of a portable terminal according to an exemplary embodiment of the present invention.

FIG. 7 is a screen example illustrating a method of receiving an event message of a portable terminal according to an exemplary embodiment of the present invention.

Referring to FIGS. 1 to 7, when an event message is received, the controller 110 can display an icon or image that informs of the reception at one side of the display unit 130. For example, the controller 110 can display a number-type icon 71 at one side of the phonebook menu 70 on the home screen as shown in the screen example of reference numeral 710. The number is changed according to the number of event messages which are not checked by user. Further, the icon 71 can be displayed in an indicator area where an icon showing battery level and signal strength is displayed.

If a user touches the phonebook menu 70, the display unit 130 can display the phonebook screen. For example, the display unit 130 can output the phonebook screen as shown in the screen example of reference numeral 720. The phonebook screen can include a notification menu 80 that requests to output only the phonebook list where the group name and a new event message exist. At this time, a number icon, which indicates the number of unidentified new event messages included in each group, can be outputted at one side of the group name. Referring to the screen of reference numeral 720, the user can recognize that one new event message exists in the family group, one new event message exists in the friend group, and three new event messages exist in the company group. The user can select one group, and check the new event messages existing in the group.

Further, if the user touches the notification menu 80, the display unit 130 can output only the phonebook list where a new event message exists as shown in the screen example of reference numeral 730. At this time, a number icon indicating the number of new event messages can be outputted at one side of each phonebook list. The user can select one item and check a corresponding event message. For example, if user touches "Hong Gil Dong" in a state as shown in reference numeral 730, the controller 110 can control the display unit 130 to output a corresponding event message as shown in reference numeral 740 (e.g., first-birthday party invitation message). Referring to the screen example of reference numeral 740, the upper part of the event message screen can include a return menu 72 that returns to the previous step, and an edit menu 73 that can edit the event message. The user can edit the event message through the edit menu 73, and reuse the event message after editing the event message or retransmit the message to another person.

Further, it was explained above that when touching the phonebook menu 70, the phonebook screen indicating the group name is outputted. However, exemplary embodiments of the present invention are not limited to this example. For example, when touching the phonebook menu 70, the display unit 130 can output a phonebook screen that outputs the entire list of the phonebook as shown in the screen example of reference numeral 750. In such an exemplary embodiment, each item of the phonebook list can include a number icon indicating the number of new event messages. The user can check the information (e.g., an event message or a phone number) of corresponding items by selecting one item from the phonebook list. For example, if user touches "Hong Gil Dong" from the screen example of reference numeral 750, the controller 110 can control the display unit 130 so that the phonebook information display screen as shown in the screen example of reference numeral 760. The phonebook information display screen can include a phonebook information display area 81 displaying phonebook information such as the mobile phone number and the home phone number, and an event information display area 82 displaying the event information. If an event item is touched in the event information display area 82, an event message screen corresponding to the selected event item can be outputted as illustrated in the screen example of reference numeral 740. Further, one set of event information has been illustrated in the screen example of reference numeral 760. However, if a multiple of event messages are received, the controller 110 can display a multiple of sets of event information in the event information display area 82.

Figure 8:
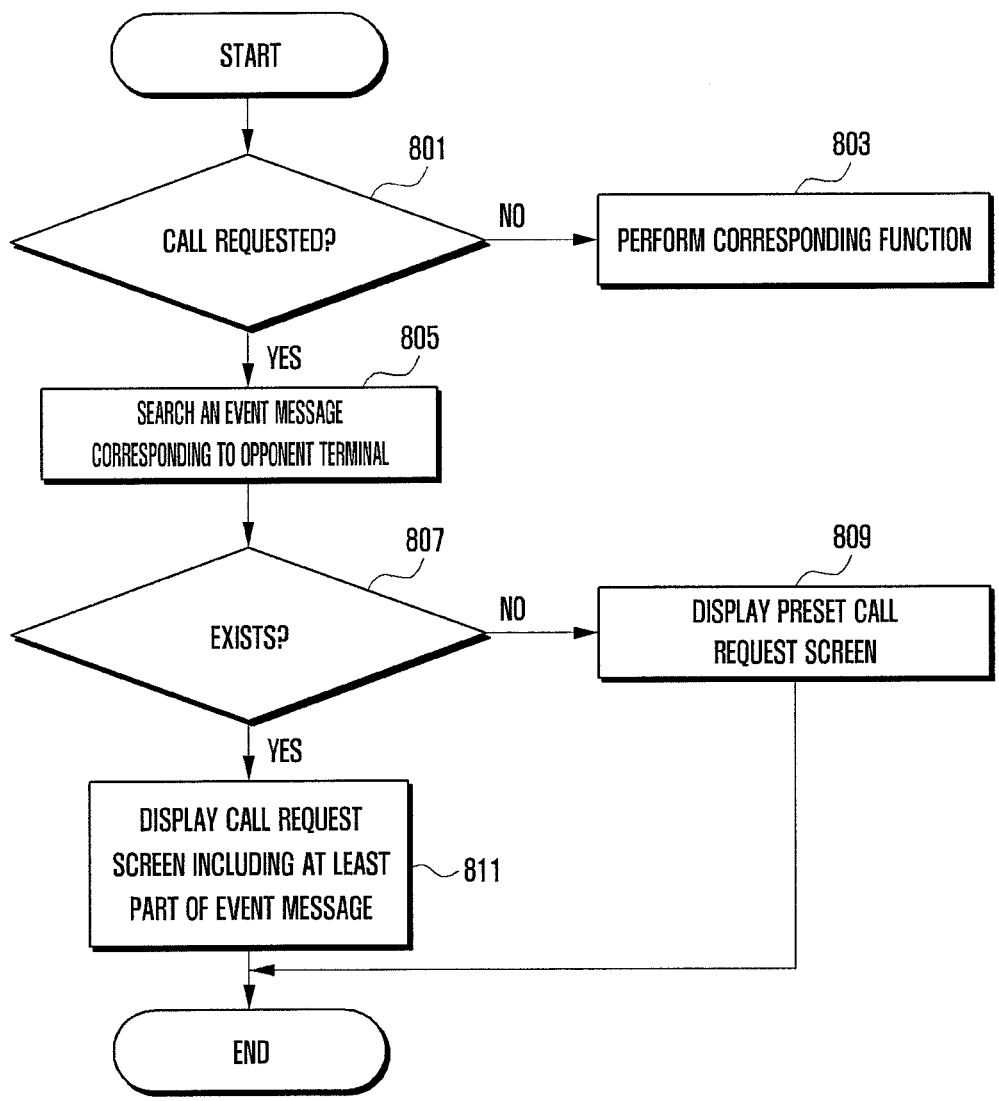
FIG. 8 is a flowchart illustrating a method of displaying an event message when transmitting and receiving a call according to an exemplary embodiment of the present invention.
Figure 9:
FIG. 9 is a screen example illustrating a method of displaying an event message when transmitting and receiving a call according to an exemplary embodiment of the present invention.

FIG. 8 is a flowchart illustrating a method of displaying an event message when a call is requested according to an exemplary embodiment of the present invention. FIG. 9 is a screen example illustrating a method of displaying an event message when transmitting and receiving a call according to an exemplary embodiment of the present invention.

Referring to FIGS. 4 to 9, the controller 110 can determine whether a call request is received at step 801. The call request can include a call transmission that requests a call to the opponent terminal, and a call reception that receives a call request from the opponent terminal. If the call request is not generated, the controller 110 can perform a corresponding function at step 803. For example, the controller 110 can perform a music replay function, a photographing function, a game function, etc. according to user's request. In contrast, if a call request is generated, the controller 110 can search an event message corresponding to the opponent terminal at step 805, and confirm whether the event message exists at step 807. If a corresponding event message does not exist, the controller 110 can display a preset call request screen at step 809. In contrast, if a corresponding event message exists, the controller 110 can display a call screen including at least part of the event message at step 811. For example, as illustrated in FIG. 9, the display unit 130 can display part 90 of the event message at one side of the call request screen including the opponent information (e.g., the opponent's image, the opponent's phone number, and the like), and a message that informs of the call request state. Further, FIG. 9 illustrates that only part of the event message is displayed. However, exemplary embodiments of the present invention are not limited to this example. For example, the display unit 130 can display the event message as the call request screen. Such an event message can be set not to be outputted if a certain period of time passes. Further, when an event message is generated, a period when an event message is displayed can be set. For example, if an event date is designated as in a first-birthday party, the event message can be set not to be outputted after the event date. Further, according to another exemplary embodiment of the present invention, it is possible to output only new event messages which are not confirmed by user in the calling screen.

The method of transmitting and receiving an event message according to an exemplary embodiment of the present invention may be implemented in an executable program command form by various computer means and be recorded in a computer readable recording medium. For example, the computer readable recording medium may include a program command, a data file, and a data structure individually or a combination thereof. In the meantime, the program command recorded in a recording medium may be specially designed or configured for the present invention or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A system for transmitting and receiving an event message, the system comprising:
   a transmitting terminal configured to generate an event message, and to transmit the event message and caller information;
   an event message service server configured to store phonebook data after receiving the phonebook data transmitted from at least one terminal, the at least one terminal including at least one of the transmitting terminal and a receiving terminal, to search the phonebook data for at least one receiving terminal corresponding to the caller information associated with the event message received from the transmitting terminal upon receiving the event message, and to transmit the event message to the searched at least one receiving terminal; and
   the receiving terminal configured to receive an event message transmitted by the event message service server, and to provide a notification to its user of reception of the event message,
   wherein the event message service server transmits a caller information registration request message to at least one receiving terminal associated with the event message that is not registered with the event message service server upon determining that the phonebook data stored on the event message service server does not include caller information for the at least one receiving terminal.

2. The system of claim 1, wherein the event message service server determines whether already registered company information is included when sensing an update of a specified user's phonebook data, and, if the company information is included in the user's phonebook data, then the event message service server adds the user's phone number in the phonebook data of the company.

3. The system of claim 1, wherein the event message service server receives a response message to the registration request message, adds the caller information to the phonebook data of the receiving terminal if allowed, and transmits the event message to the receiving terminal.

4. The system of claim 3, wherein the event message service server searches for a receiving terminal among receiving terminals which are not included in the phonebook data of the transmitting terminal for which corresponding phonebook data includes the caller information, and further transmits the event message to the searched receiving terminal.

5. The system of claim 1, wherein the receiving terminal informs its user of reception of an event message using at least one of a visual alert, an auditory alert, and a tactile alert when receiving the event message.

6. The system of claim 4, wherein the receiving terminal displays an icon, which indicates that an event message is received, at one end of the phonebook menu of a home screen when receiving the event message.

7. The system of claim 6, wherein the receiving terminal outputs a phonebook list, and displays an icon, which indicates reception of an event message in a phonebook item corresponding to a transmitting terminal that has transmitted the event message, when a phonebook menu is selected.

8. The system of claim 7, wherein the receiving terminal outputs an event message screen that outputs an event message when a phonebook item which displays the icon is selected.

9. The system of claim of 6, wherein the receiving terminal outputs a phonebook screen including a notification menu when the phonebook menu is selected, and outputs a phonebook list comprising phonebook items including new event messages which are not confirmed by its user.

10. The system of claim 1, wherein the receiving terminal determines whether there is an event message related with a call-requested opponent terminal when a call is requested, and if there is such a related event message, then the receiving terminal displays a call request screen including at least part of the related event message.

11. The system of claim 1, further comprising:
   a web server configured to provide a web service that generates and manages the event message; and
   a computer configured to connect to the web server, and to transmit data related to the generation of the event message.

12. The system of claim 11, wherein the transmitting terminal connects to the web server, and transmits data related to the generation of the event message.

13. The system of claim 1, wherein the transmitting terminal includes an application program for generating the event message.

14. A method for transmitting and receiving an event message, the method comprising:
   storing phonebook data after receiving the phonebook data transmitted from at least one terminal, the at least one terminal including at least one of a transmitting terminal and a receiving terminal;

receiving the event message;
checking caller information corresponding to the transmitting terminal that transmitted the received event message;
searching phonebook data of one or more receiving terminals stored in the phonebook data of the transmitting terminal;
determining whether the phonebook data of the searched receiving terminals includes the caller information;
transmitting the event message to the receiving terminal if the searched phonebook data includes the caller information, and
transmitting a registration request message of the caller information to the receiving terminal if the searched phonebook data does not include the caller information,
wherein the receiving terminal provides a notification to its user of reception of the event message.

15. The method of claim 14, wherein the storing of the phonebook data after receiving the phonebook data includes:
receiving transmitted phonebook data of an individual user and a company and storing the received phonebook data; and
updating phonebook data of the individual user periodically.

16. The method of claim 15, further comprising:
determining whether already registered company information is included when sensing an update of the phonebook data of the individual user, and, if the company information is included, then adding the phone number of the individual user to the phonebook data of the company.

17. The method of claim 14, further comprising:
receiving a response message to the registration request message of the caller information; and
adding the caller information to the phonebook data of the corresponding receiving terminal if the response message indicates acceptance, and transmitting the event message to the corresponding receiving terminal.

18. The method of claim 14, further comprising:
searching phonebook data of the remaining receiving terminals which are not included in the phonebook data of the transmitting terminal; and
transmitting the event message to at least one receiving terminal among the remaining receiving terminals for those remaining terminals that have corresponding phonebook data that includes the caller information.

19. The method of claim 14, further comprising:
informing, by the receiving terminal which has received the event message, of reception of the event message using at least one of a visual alert, an auditory alert, and a tactile alert.

20. The method of claim 19, wherein the informing of the reception of the event message includes displaying an icon that indicates reception of the event message at one side of the phonebook menu of a home screen.

21. The method of claim 20, wherein the informing of the reception of the event message outputs a phonebook list when the phonebook menu is selected, and displays an icon that indicates reception of the event message in a phonebook item corresponding to the transmitting terminal that has transmitted the event message.

22. The method of claim 21, wherein the informing of the reception of the event message includes an event message screen output process that outputs an event message when a phonebook item that displays the icon is selected.

23. The method of claim 20, wherein the informing of the reception of the event message further comprises:
outputting a phonebook screen including a notification menu when the phonebook menu is selected; and
outputting a phonebook list comprising phonebook items including new event message which are not confirmed by user when the notification menu is selected.

24. The method of claim 20, wherein the informing of the reception of the event message further comprises:
checking information of call-requested opponent terminal when a call is requested;
determining whether there is an event message related with the checked opponent terminal information; and
outputting a call request screen including at least part of the related event message in a calling screen if there is a related event message.

25. A method for transmitting an event message, the method comprising:
generating an event message;
transmitting the generated event message and caller information to an event message service server;
determining, by the event message service server, whether a receiving terminal associated with the event message is registered with the event message service server by searching phonebook data stored on the event message service server includes caller information corresponding to the receiving terminal upon receiving the event message from the transmitting terminal; and
transmitting a caller information registration request message to the receiving terminal that is not registered with the event message service server upon determining that the phonebook data stored on the event message service server does not include caller information for the receiving terminal,
wherein the receiving terminal provides a notification to its user of reception of the event message.

26. The method of claim 25, wherein the generating of the event message comprises at least one of:
executing an application program for generating the event message; and
connecting to a web page for generating the event message.

27. The method of claim 26, wherein the application program for generating the event message is one of included in a phonebook application program for phonebook management, or included so as to separately exist with the phonebook application program for program management.

28. The method of claim 25, wherein the generating of the event message includes generating an event message by preset groups.

29. The method of claim 25, further comprising:
searching, by the event message service server, for phonebook data of an already registered caller, and extracting, by the event message service server, at least one receiving terminal; and
transmitting the event message to at least one receiving terminal among the extracted one or more receiving terminals for those extracted one or more receiving terminals that have corresponding phonebook data that includes the caller information.

30. A method for receiving an event message, the method comprising:
receiving, by a receiving terminal, a caller information registration request message if an event message service server determines, upon receipt of an event message and caller information from the transmitting terminal, that the receiving terminal, which is associated with an event message, is not registered with the event message service server by searching phonebook data, stored after receiving the phonebook data from at least one terminal, the at least one terminal including at least one of the transmitting terminal and the receiving terminal, for the receiving terminal, receiving, by the receiving terminal, the event message from the event message service server; and displaying, by the receiving terminal, an icon that indicates reception of the event message at one end of a phone menu of a home screen.

31. The method of claim 30, further comprising:

outputting a phonebook list when a phonebook menu is selected, and displaying an icon that indicates reception of the event message to a phonebook item corresponding to a transmitting terminal that transmitted the event message.

32. The method of claim 31, further comprising:

outputting an event message screen that outputs detailed information of an event message when the icon on the displayed phonebook item is selected.

33. The method of claim 30, further comprising:

outputting a phonebook screen including a notification menu when the phonebook is selected; and outputting a phonebook list comprising only phonebook items including new event message which have not been confirmed by a receiving terminal user when the notification menu is selected.

34. The method of claim 30, further comprising:

checking call-requested opponent terminal information when a call is requested;

determining whether there is an event message related with the checked opponent terminal information; and outputting a call request screen including at least part of the related event message if there is a related event message.

* * * * *